United States Patent [19]

Wegener

[11] Patent Number: 4,801,887
[45] Date of Patent: Jan. 31, 1989

[54] CIRCUIT ARRANGEMENT FOR GENERATING A DIRECT VOLTAGE FROM A SINUSOIDAL INPUT VOLTAGE

[75] Inventor: Armin F. Wegener, Aachen, Fed. Rep. of Germany

[73] Assignee: U.S. Philips Corp., New York, N.Y.

[21] Appl. No.: 35,533

[22] Filed: Apr. 7, 1987

[30] Foreign Application Priority Data

Apr. 10, 1986 [DE] Fed. Rep. of Germany ....... 3612147

[51] Int. Cl.⁴ ...................... H03K 5/00; H03K 17/00; H03K 5/19
[52] U.S. Cl. ....................... 328/26; 328/32; 328/171; 307/261; 307/519
[58] Field of Search ........... 328/26, 32, 171; 307/261, 519, 260; 323/266, 282, 284, 285, 286; 315/209 T, 238; 363/60, 61, 89, 126

[56] References Cited

U.S. PATENT DOCUMENTS

| | | | |
|---|---|---|---|
| 3,372,326 | 3/1968 | Stefanov | 363/89 |
| 3,947,752 | 3/1976 | Morgan | 323/284 |
| 4,412,278 | 10/1983 | Cambier et al. | 363/126 |
| 4,417,198 | 11/1983 | Mayfied | 363/126 |
| 4,555,753 | 11/1985 | Takahashi | 363/126 |
| 4,559,594 | 12/1985 | Sears et al. | 363/126 |
| 4,712,169 | 12/1987 | Alleach | 323/282 |
| 4,719,552 | 1/1988 | Albach et al. | 323/282 |

FOREIGN PATENT DOCUMENTS

| | | | |
|---|---|---|---|
| 0168183 | 1/1986 | European Pat. Off. | 363/126 |
| 2106279 | 4/1983 | United Kingdom . | |

Primary Examiner—John S. Heyman
Assistant Examiner—Trong Quang Phan
Attorney, Agent, or Firm—Bernard Franzblau

[57] ABSTRACT

A circuit arrangement for generating a direct voltage from a sinusoidal input voltage. A capacitor (2) is coupled to an output terminal (3) of a rectifier (1) which receiver the input voltage and is discharged via a first diode arrangement (5) and a load (10) which is connected to the output of the rectifier (1). A series circuit is connected in parallel with the first diode arrangement (5) and comprises a second diode arrangement (4), via which only the chage current of the capacitor (2) flows, and at least a parallel arrangement of a control circuit (9) and a smoothing capacitor (7).

16 Claims, 1 Drawing Sheet

CIRCUIT ARRANGEMENT FOR GENERATING A DIRECT VOLTAGE FROM A SINUSOIDAL INPUT VOLTAGE

BACKGROUND OF THE INVENTION

This invention relates to a circuit arrangement for generating a direct voltage from a sinusoidal input voltage for at least a control circuit, comprising a rectifier whose output is coupled to a smoothing capacitor arranged in parallel with the control circuit, and comprising a load which is arranged between the two output terminals of the rectifier.

A circuit arrangement of this type is known from U.S. Pat. No. 4,766,350, which issued on 8/23/88/. In this circuit arrangement a sinusoidal input voltage is applied to a rectifier whose rectified output voltage is applied to a load which is a gas or vapour discharge lamp including the required circuit elements. The sinusoidal input voltage is also applied to a second rectifier which has a first capacitor connected to its first input terminal and a second capacitor connected to its second input terminal. A parallel arrangement of a smoothing capacitor and a control circuit for operating a circuit arrangement including a gas or vapour discharge lamp is connected to the output of the second rectifier.

The capacitive voltage divider constituted by the first and second capacitors and the smoothing capacitor generates the voltage required for the supply of the control circuit. Since the negative reference points of the two rectifiers are interconnected via a capacitor, the potential at the negative reference point of the second rectifier fluctuates. It has been found that this results in distortions of the input current for the circuit arrangement, which distortions exert a load on the mains supplying the sinusoidal input voltage.

SUMMARY OF THE INVENTION

It is an object of the invention to provide a circuit arrangement of the type described in the opening paragraph in which the control circuit and the load have a common connection point.

According to the invention this object is realised in that a capacitor which is coupled to a first output terminal of the rectifier can be discharged via a first diode arrangement and the load and that a series circuit is provided which is arranged in parallel with the first diode arrangement and which consists of a second diode arrangement via which only the charge current of the capacitor flows, and of at least a parallel arrangement of a control circuit and a smoothing capacitor connected to a terminal of the load.

In the circuit arrangement according to the invention the capacitor is charged during the rise time of the rectified input voltage. The charge current flows through the second diode arrangement during the rise time. The first and second diode arrangements may consist of, for example at least a diode, a transistor and a thyristor. During the decay time of the rectified input voltage the capacitor can be discharged via the load and the first diode arrangement. A smoothing capacitor which is connected parallel to a control circuit is charged either during the rise time or during the decay time. During the time when no discharge or charge current of the capacitor flows through the parallel arrangement, the smoothing capacitor current flows in the control circuit. The capacitances of the capacitor and of the smoothing capacitor determine a voltage which is present at the control circuit. Since the control circuit and the load in the circuit arrangement according to the invention have the same reference point, there are no fluctuations of the potential at the control circuit. Consequently, the input current distortions produced by the fluctuating potential in the known circuit arrangement hardly occur.

In the circuit arrangement according to the invention a control circuit may be fed either with a positive or with a negative voltage. If a positive voltage is present at the control circuit, the first diode arrangement is coupled to the second terminal of the rectifier. If a negative voltage is present at the control circuit, the junction between the second diode arrangement and the parallel arrangement of the control circuit and the smoothing capacitor is coupled to the second terminal of the rectifier.

The above-mentioned embodiments can be combined, i.e. a combination of a control circuit requiring a positive voltage and a control circuit requiring a negative voltage. In this further embodiment the series circuit arranged parallel to the first diode arrangement comprises a first parallel arrangement of a first control circuit and a first smoothing capacitor and a second parallel arrangement of a second control circuit and a second smoothing capacitor, while the junction of the two parallel arrangements is coupled to the second terminal of the rectifier.

If a load controlled by the control circuit is used in the circuit arrangement according to the invention and if it is switched on when the voltage at the control circuit(s) reaches a threshold value, the discharge current of the capacitor cannot flow through these circuits. To this end a starter circuit is provided via which at least the discharge current of the capacitor flows until the threshold value is reached. If the load is switched on, the discharge current can flow through this load.

The starter circuit may be formed in such a way that it comprises a transistor whose collector is coupled to the first terminal of the rectifier and whose emitter is coupled to the junction between the second diode arrangement and the parallel arrangement of the control circuit and the smoothing capacitor. The discharge current of the capacitor, with which at least a smoothing capacitor is charged, then flows via the collector-emitter path of the transistor. The transistor will become inoperative in this circuit arrangement when the voltage at the smoothing capacitor is higher than the voltage at the base of the transistor.

The circuit arrangement according to the invention can be used for operating a supply unit, for example a circuit arrangement for operating a discharge lamp. The load is then formed as the supply unit and the control circuit is provided for controlling the supply unit.

A zener diode may be connected in parallel with the control circuit for the purpose of limiting the voltage at the control circuit.

BRIEF DESCRIPTION OF THE DRAWINGS

The invention will now be described in greater detail by way of example with reference to the accompanying drawing in which.

DESCRIPTION OF THE PREFERRED EMBODIMENTS

Figure 1:
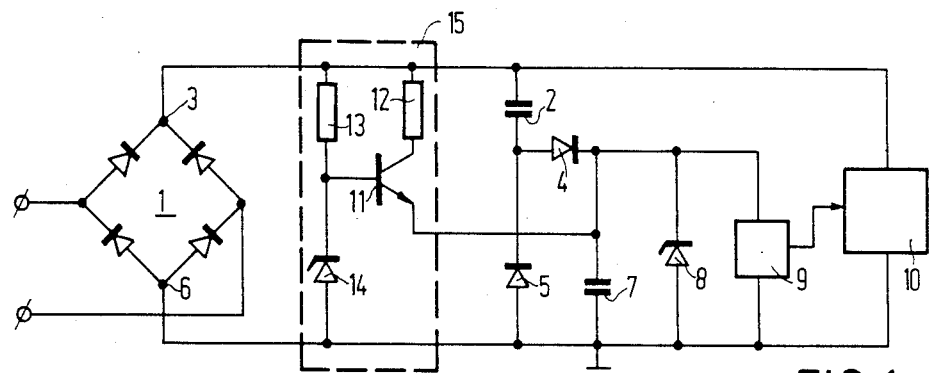
FIGS. 1 to 3 show embodiments according to the invention.

In FIG. 1 a sinusoidal input voltage having an effective value of, for example 220 V and a frequency of 50 Hz is applied to a rectifier 1. A capacitor 2 is connected at one end to a positive output terminal 3 of the rectifier 1 and at the other end to the anode of a diode 4 and the cathode of a diode 5. The anode of the diode 5 is connected to a ground terminal 6 of the rectifier 1. A parallel arrangement of a smoothing capacitor 7, a zener diode 8 and a control circuit 9 is arranged between the cathode of the diode 4 and the ground terminal 6 of the rectifier 1. The control circuit 9 controls a load 10, for example a high-frequency circuit arrangement for operating a discharge lamp, which is connected to the positive terminal 3 and the ground terminal 6 of the rectifier 1 and which may be, for example a power supply unit. The cathode of the zener diode 8 which serves to limit the voltage is connected to the cathode of the diode 4.

After switching on, i.e. when the circuit arrangement of FIG. 1 receives a sinusoidal input voltage, the load 10 (representing the operating or power supply unit of the lamp) does not operate. Before it is ready for operation the required constant direct voltage must be built up at the control circuit 9 in order that this circuit can activate load 10 by means of a control signal.

Consequently, a voltage required for the control circuit must be built up at the capacitor 7. The capacitance of the capacitor 7 is to be chosen in such a manner that the voltage at the capacitor 7 does not drop below a given value required for the operation of the control circuit during discharge of this capacitor via the control circuit.

After switching on the power, during the first rise time of the rectified sinusoidal input voltage, the diode 4 will conduct and the diode 5 will be cut off so that the two capacitors 2 and 7, constituting a capacitive voltage divider, are charged. The capacitances of the capacitors 2 and 7 determine their voltage. Provided that the capacitance of the capacitor 2 is chosen to be such that the voltage required for the control circuit is built up at the capacitor 7 and the control circuit and the power supply unit become ready for operation without any delay, the capacitor 2 can be discharged during the decay time of the rectified sinusoidal input voltage via the load 10 and the diode 5 which will be conducting, while diode 4 is cut off. During the decay time of the rectified sinusoidal input voltage the control circuit 9 receives the required current from the capacitor 7. During the next rise time the capacitor 2 is charged and the capacitor 7 is recharged.

However, after switching on, a power supply unit is generally not ready for operation until after several oscillations of the sinusoidal input signal. For this reason a starter circuit 15 is provided which charges the capacitor 7 until the power supply unit is activated and via which circuit the capacitor 2 can be discharged. The starter circuit 15 comprises an npn-transistor 11 whose collector is connected via a resistor 12 to the positive terminal 3 of the rectifier 1 and whose emitter is connected to the cathode of the diode 4. The base of the transistor 11 is connected to a resistor 13 connected in turn to the positive terminal of the rectifier 1. The base of transistor 11 is also connected to the cathode of a zener diode 14. The anode of the zener diode 14 is connected to the ground terminal 6.

After switching on the power, the capacitor 7 is charged via the transistor 11 during the rise time of the rectified sinusoidal input voltage. The capacitor 2 is also charged. During the decay time of the rectified sinusoidal input voltage the discharge current of the capacitor 2 flows via the transistor 11 and the diode 5 in the capacitor 7. The starter circuit 15 is ready for operation until the sum voltage of the base-emitter voltage of the transistor 11 and the zener voltage of the zener diode 14 is smaller than the voltage at capacitor 7. After the starter circuit 15 is switched off, the capacitor 7 is recharged via the capacitor 2 and the diode 4 during the subsequent rise time of the rectified sinusoidal input voltage. During the decay time the capacitor 2 is discharged via the load and the diode 5.

Since, after switching on, the capacitor 7 is charged via the starter circuit 15, it can be formed in such a manner that it supplies the required current for the control circuit 9. The capacitance C of the capacitor 2 can be calculated in accordance with the following formula:

$$C = 2I/(U_n - U_a)2\pi f$$

in which I is the load current, $U_n$ is the effective value of the sinusoidal input voltage, $U_a$ is the operating voltage at the control circuit and f is the frequency of the sinusoidal input voltage.

In a practical circuit construction a control circuit was used with a voltage of approximately 12 V and a load current of approximately 3 mA. The capacitance of the capacitor 7 was 220 μF. and the capacitance of the capacitor 2 was calculated to be 0.1 μF.

Since the control circuit and the load 10 have the same ground terminal, it has been proved that the input current distortions are negligible. In addition the circuit arrangement according to the invention has a higher efficiency because substantially only small losses occur in the resistor 13, which may be a high-impedance resistor, and in the zener diode 14.

Figure 2:
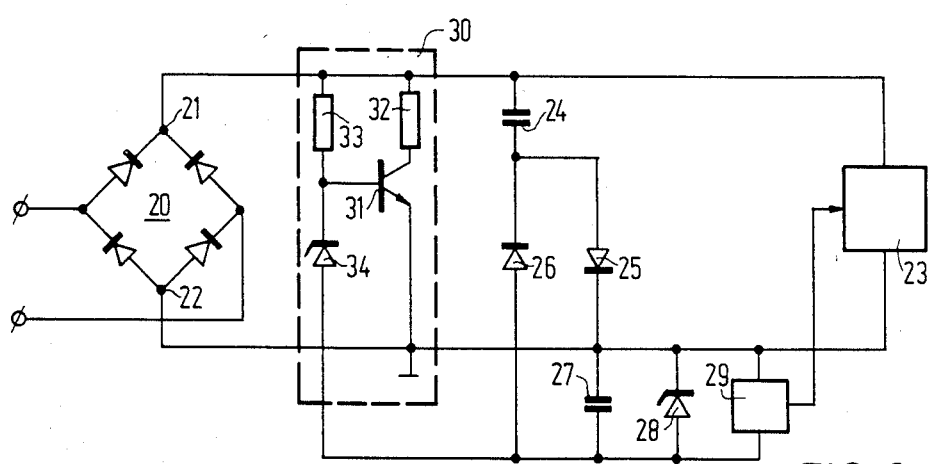

FIG. 2 shows a second embodiment of the circuit arrangement according to the invention. A sinusoidal input voltage is applied to a rectifier 20. A load 23 is arranged between a positive output terminal 21 and a ground terminal 22 of the rectifier 20. A capacitor 24 is connected at one end to the positive terminal 21 and at the other end to the anode of a diode 25 and the cathode of a diode 26. The cathode of the diode 25 is connected to the ground terminal 22. A parallel arrangement of a capacitor 27, a voltage-limiting zener diode 28 and a control circuit 29 controlling the load 23 is connected between the anode of the diode 26 and the ground terminal 22. The cathode of the zener diode 28 is connected to the ground terminal 22. Unlike the embodiment of FIG. 1, the control circuit 29 in the embodiment of FIG. 2 is operated with a negative supply voltage. Furthermore a starter circuit 30 is provided which comprises an npn transistor 31 whose collector is connected via a resistor 32 to the positive terminal 21 and whose emitter is connected to the ground terminal 22 of the rectifier 20. A high-impedance resistor 33 is arranged between the base of transistor 31 and the positive terminal 21. The cathode of a zener diode 34, whose anode is connected to the anode of the diode 26, is connected to the base of transistor 31.

After switching on the power, the capacitor 24, in which the charge current flows through the conducting diode 25, is charged during the rise time of the rectified sinusoidal input voltage. During the decay time of the rectified sinusoidal input voltage the discharge current of the capacitor 24 flows via the transistor 31 and the conducting diode 26 in the capacitor 27. The starter circuit 30 is operative until the voltage at the capacitor 27 is larger than the sum voltage of the zener voltage of the zener diode 34 and the base-emitter voltage of the transistor 31. After switching off the starter circuit, the capacitor 27 is only recharged with the discharge current of the capacitor 24.

Figure 3:
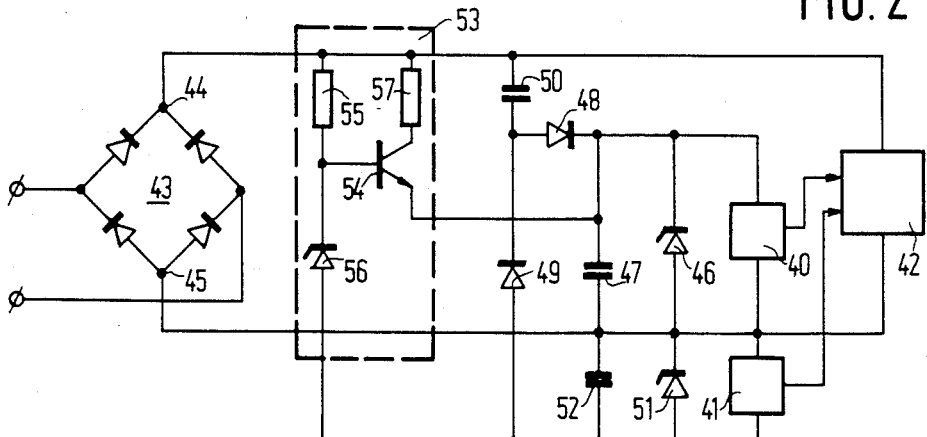

FIG. 3 shows a combination of the embodiments of FIGS. 1 and 2. In this embodiment a control circuit 40 is operated with a positive supply voltage and a control circuit 41 is operated with a negative supply voltage. The two control circuits 40 and 41 each control a load 42. In the circuit arrangement of FIG. 3, according to the invention a sinusoidal input voltage is applied to a rectifier 43. The load 42 is arranged between a positive terminal 44 and a ground terminal 45 of the rectifier 43. The control circuit 40 is arranged in parallel with a voltage-limiting zener diode 46 and a capacitor 47. The anode of the zener diode 46 is connected to the ground terminal 45. The parallel arrangement is connected between the ground terminal 45 and the cathode of a diode 48. The anode of the diode 48 is connected to the cathode of a diode 49 and to a capacitor 50 connected in turn to the positive terminal 44. The control circuit 41 is also arranged in parallel with a voltage-limiting zener diode 51 and a capacitor 52. The cathode of the zener diode 51 is connected to the ground terminal 45. The parallel arrangement is connected between the ground terminal 45 and the anode of the diode 49. A starter circuit 53 comprises an npn transistor 54 which has its base connected to a resistor 55, connected in turn to the positive terminal 44, and to the cathode of a zener diode 56. The anode of the zener diode 56 is connected to the anode of the diode 49. The emitter of the transistor 54 is connected to the cathode of the diode 48 and the collector is connected to the positive terminal 44 via a resistor 57.

After switching on the power, the capacitor 50 and the capacitor 47 are charged during the rise time of the rectified sinusoidal input voltage. During the decay time of the rectified sinusoidal input voltage the discharge current of the capacitor 50 flows via the transistor 54 and the diode 49 in the capacitors 47 and 52. The starter circuit 53 is ready for operation until the sum voltage of the base-emitter voltage of the transistor 54 and the zener voltage of the zener diode 56 is smaller than the sum voltage of the capacitors 47 and 52. After switching off the starter circuit 53, the capacitor 47 is recharged via the conducting diode 48 during the rise time of the rectified sinusoidal input voltage and the capacitor 52 is recharged via the conducting diode 49 during the decay time of the rectified sinusoidal input voltage.

What is claimed is:

1. A circuit arrangement for generating a direct voltage from a sinusoidal input voltage comprising: a rectifier having first and second output terminals coupled to a smoothing capacitor connected in parallel arrangement with a control circuit, a load coupled between said first and second output terminals of the rectifier, a capacitor coupled between the first output terminal and a first diode arrangement so that said capacitor can be discharged via the first diode arrangement and the load, a series circuit connected in parallel with the first diode arrangement and which includes a second diode arrangement, via which only a charge current of the capacitor flows, in series with said parallel arrangement of the control circuit and the smoothing capacitor, and wherein a terminal of the control circuit is connected in common with a terminal of the load.

2. A circuit arrangement as claimed in claim 1, characterized in that the first diode arrangement is coupled to the second output terminal of the rectifier.

3. A circuit arrangement as claimed in claim 1, characterized in that a junction between the second diode arrangement and the parallel arrangement of the control circuit and the smoothing capacitor is coupled to the second output terminal of the rectifier (20).

4. A circuit arrangement as claimed in claim 1, characterized in that the series circuit comprises a first parallel arrangement of a first control circuit and a first smoothing capacitor and a second parallel arrangement of a second control cicruit and a second smoothing capacitor and in that a junction of the two parallel arrangements is coupled to the second output terminal of the rectifier.

5. A circuit arrangement as claimed in claims 1, 2, 3 or 4 wherein the load is controlled by the control circuit so that it is switched on when a voltage at the control circuit(s) reaches a threshold value, and means coupling the capacitor to a starter circuit in a manner such that the discharge current of the capacitor flows via the starter circuit until the threshold value is reached.

6. A circuit arrangement as claimed in claim 5, characterized in that the starter circuit comprises a transistor whose collector is coupled to the first output terminal of the rectifier and whose emitter is coupled to a junction between the second diode arrangement and the parallel arrangement of the control circuit and the smoothing capacitor.

7. A circuit arrangement as claimed in claim 6, characterized in that the load comprises a power supply unit and in that the control circuit controls the power supply unit.

8. A circuit arrangement as claimed in claim 1 characterized in that a voltage-limiting zener diode is coupled in parallel with each control circuit.

9. A circuit arrangement as claimed in claim 5 wherein the load comprises a power supply unit and the control circuit controls said power supply unit.

10. A circuit arrangement as claimed in claim 1 wherein the load comprises a power supply unit and the control circuit includes an output terminal coupled to the load so as to control said power supply unit.

11. An AC/DC converter circuit comprising: a pair of input terminals for connection to an AC source of sinusoidal voltage, a rectifier having input terminals connected to said AC input terminals and first and second output terminals coupled to a load, a smoothing capacitor connected in parallel with a control circuit having one terminal connected in common with one terminal of the load, a capacitor coupled to the first output terminal of the rectifier, to the load and to a first diode in a manner such that the load and first diode form a discharge path for the capacitor, and means connecting said capacitor in series with a second diode between the first output terminal of the rectifier and the smoothing capacitor so that the second diode provides a charge path for the capacitor and the smoothing capacitor.

12. A converter circuit as claimed in claim 11, wherein said one terminal of the control circuit and said one terminal of the load circuit are connected to the second output terminal of the rectifier.

13. A converter circuit as claimed in claim 11, wherein the first diode is connected in a series circuit with the capacitor across the output terminals of the rectifier.

14. A converter circuit as claimed in claim 11, wherein at least the capacitor and second diode are connected in series circuit across the output terminals of the rectifier and to the smoothing capacitor in a manner such that the discharge path for the capacitor also includes the smoothing capacitor.

15. A converter circuit as claimed in claim 11, further comprising a starter circuit including a switchable transistor coupled to said capacitor and to the smoothing capacitor and first diode such that the transistor, the smoothing capacitor and the first diode form a discharge path for the capacitor upon start-up of the converter circuit.

16. A converter circuit as claimed in claim 15, wherein the switchable transistor is coupled to the smoothing capacitor so that a voltage developed across the smoothing capacitor determines the conduction state of the transistor.

* * * * *